Figure 1:
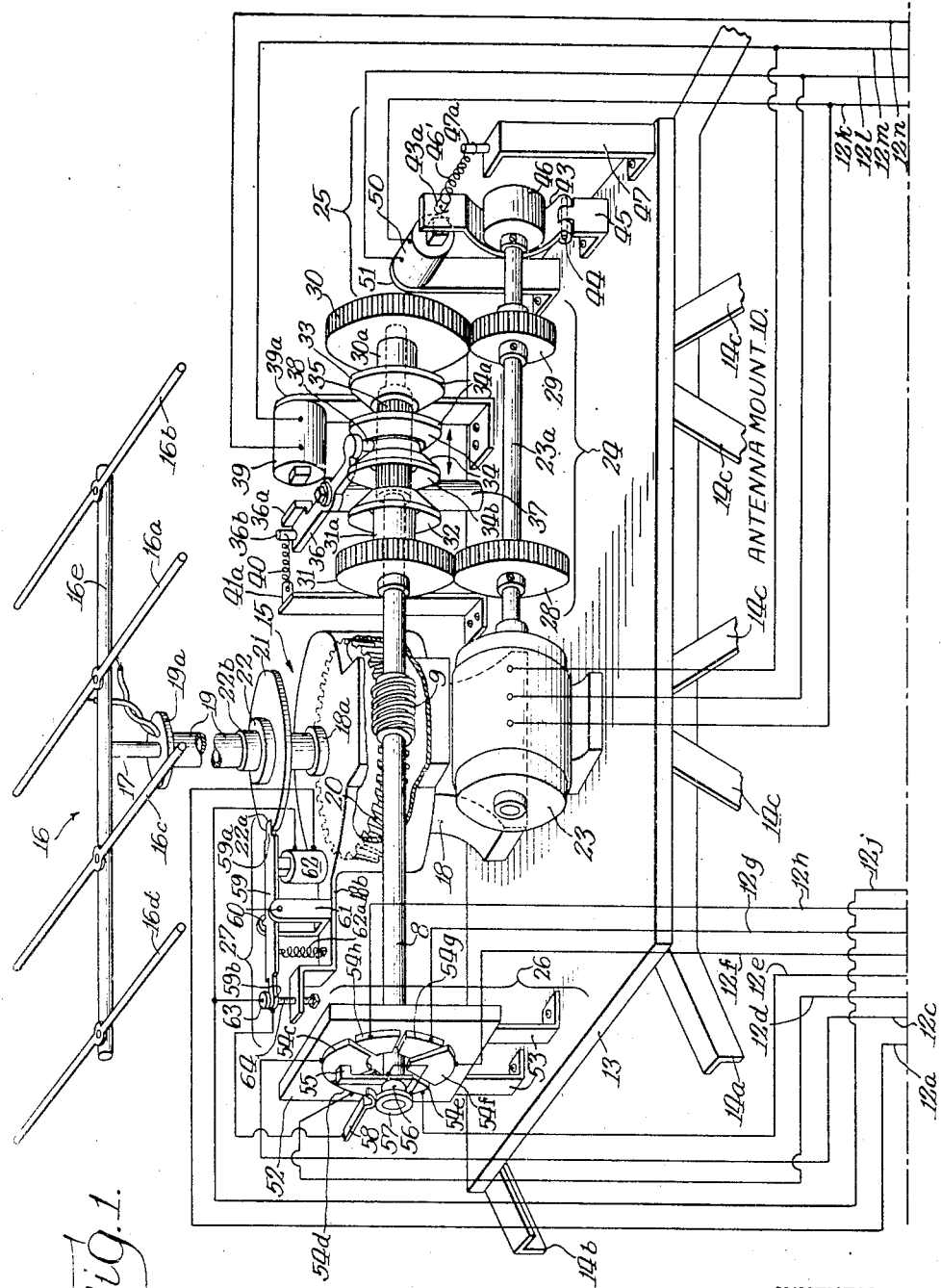

Jan. 11, 1949.    W. L. DUNN    2,458,983
ELECTRIC MOTOR FOLLOW-UP CONTROL SYSTEM
Filed April 29, 1943    2 Sheets-Sheet 1

INVENTOR.
William L. Dunn,
BY
Foorman L. Mueller
Atty.

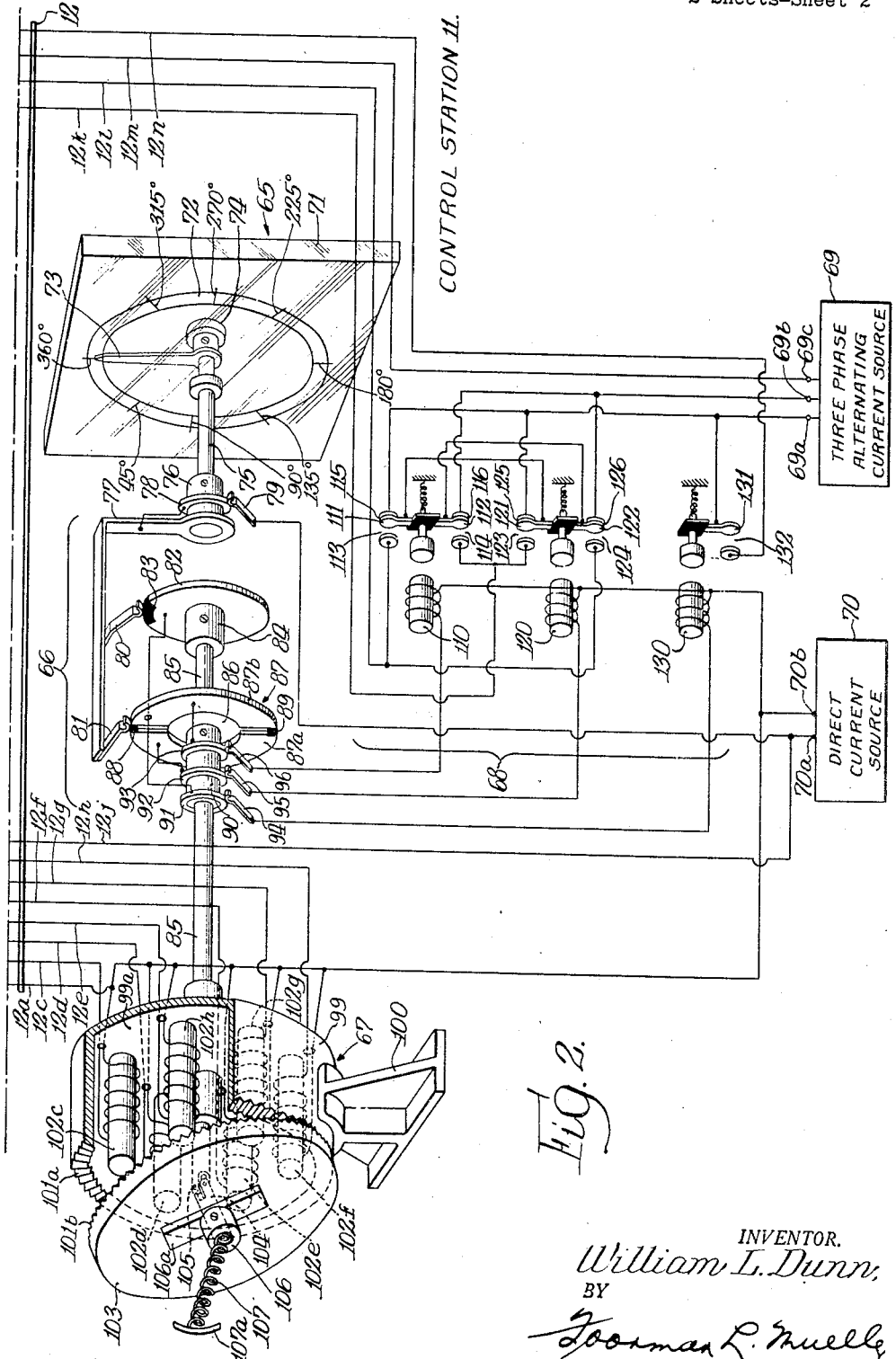

Patented Jan. 11, 1949

2,458,983

UNITED STATES PATENT OFFICE 2,458,983

ELECTRIC MOTOR FOLLOW-UP CONTROL SYSTEM

William L. Dunn, Chicago, Ill., assignor, by mesne assignments, to Belmont Radio Corporation, Chicago, Ill., a corporation of Illinois Application April 29, 1943, Serial No. 485,061

14 Claims. (Cl. 318—31)

The present invention relates to control systems and more particularly to improved apparatus for quickly and accurately setting an adjustable settable element, such, for example, as the antenna positioning shaft of an antenna mount, to any desired position by controlling the settable element from a remote point.

In a control system which is to be utilized for the purpose mentioned, i. e., the operation of an antenna control shaft to different settings, as well as in other applications, it is necessary to move a large and heavy mass, either supported by the settable element or connected in driving relationship therewith, from any established position to a new position with rapidity and precision accuracy. For example, in remotely controlling a heavy directional antenna which is exposed to the wind and elements, it is necessary to provide control equipment which is capable of moving the antenna from any established azimuth setting to any other azimuth setting within a time interval of only a few seconds. Moreover, the response of the antenna to a given change in the position of the remotely located setting element must positively and accurately conform to the change in position of the setting element, since otherwise a true bearing of the antenna in the desired direction may not be established when the setting element is operated to a position indicative of the particular bearing desired. The above requirements are difficult to meet with the control systems which are presently available in the art. Thus, conventional Selsyn motors fail to produce sufficient torque to move heavy objects, and when subjected to heavy loads become inaccurate in their response to the controls exercised thereover. Other types of systems are objectionable in the same respects as Selsyn systems, and, in addition, are not sufficiently accurate for many uses and are too slow in responding to the controls to which they are subjected. Moreover, all such systems are exceedingly complicated and hence are expensive to manufacture and install.

It is an object of the present invention, therefore, to provide a new and improved electromechanical control system which is simple in arrangement, is capable of moving a settable or controlled element of large mass and weight from any established setting to any desired new setting with precision accuracy, and includes facilities for automatically resetting certain of the moving parts thereof to establish predetermined relative positions therebetween following a period during which the system is inadvertently rendered inactive due to power failure or the like.

It is a further object of the invention to provide an improved control system of the character described, wherein the power transmission and speed changing equipment is located at the same point as the settable element, the apparatus for directing the operation of this equipment is located at a remote point, and provisions are made for automatically resynchronizing the operation of the apparatus at the control point with the operation of the equipment at the controlled point following a period of power failure.

In accordance with another object of the invention, improved facilities are provided for revertively controlling the apparatus located at the control point in accordance with the operation of the remotely located settable element, in order to provide an indication of the movement of the settable element and to arrest the movement thereof when it is operated to a position precisely corresponding to the position of the settable element.

According to another object of the invention, improved facilities are provided for rendering the indicating apparatus at the control point inactive except when the indication produced thereby precisely identifies the position of the settable element.

In accordance with a further object of the invention, a control element located at the control point and synchronously operated with the settable element is utilized to identify the position of the settable element and to control the driving mechanism for the settable element, and an improved arrangement is provided for preventing the control element from being synchronously operated with the settable element when the setting of the control element does not accurately correspond to the setting of the settable element.

It is another object of the invention to provide an improved arrangement for automatically repositioning the control and settable elements relative to each other so that the settings of the two elements precisely correspond, following an interruption in the operation of the control element synchronously with the settable element.

According to another object of the invention, circuits controlled by the driving mechanism for the settable element are utilized to effect operation of the control element synchronously with the settable element, and improved facilities are provided for preventing failure of the current source commonly included in the circuits from producing an inaccurate response of the control element after the period of current source failure is ended.

According to still another and more specific object of the invention, the circuits utilized to govern the operation of the control element are automatically opened when the current source commonly included therein fails, and are only reclosed when the current source is restored and the settable and control elements are relatively repositioned so that the setting of the control element precisely corresponds to the setting of the settable element.

The invention, both as to its organization and method of operation, together with further objects and advantages thereof, will best be understood by reference to the following specification taken in connection with the accompanying drawings, in which:

Figs. 1 and 2, when laid one above the other in the order named, illustrate in schematic form a control system characterized by the features of the invention briefly referred to above.

Referring now more particularly to the drawings, the invention is illustrated as being provided in an improved control system which is utilized to control the setting of a directional antenna mounted at the top of the usual antenna tower. In general, the system comprises an antenna mount 10 which is connected to be controlled from a remotely located control station 11 by the conductors 12a to 12n, inclusive, of a cable 12 connecting the two points. If the directional antenna 16, which forms a part of the antenna mount 10, is to be used for modulated signal carrier radiation, the mount 10 may be located at any desired radiating point, while the equipment at the control station 11 may be provided within the building which houses the radio transmitting equipment. In such case, the radiating element 16a of the antenna 16 may be connected with the transmitting equipment provided in the remotely located radio shack or building by means of the usual shielded cable conductors.

Briefly considered, the antenna 16 which forms a part of the antenna mount 10, comprises the radiating element or rod 16a, a beam directing element 16b disposedly fordwardly of the radiating element 16a, and two reflector elements 16c and 16d which are disposed rearwardly of the radiating element 16a. In accordance with conventional practice, the length of the radiating element 16a is appropriately chosen to correspond to the desired frequency of transmission. Also in accordance with conventional practice, the directing element 16b is slightly shorter than the radiating element 16a, while the reflecting elements 16c and 16d are cut to a length slightly greater than the length of the radiating element 16a. The four component elements 16 of the antenna are rigidly mounted upon an insulating crossbar 16e which is rigidly supported upon the upper end of a rotatable shaft 17. This shaft and the antenna 16 carried thereby are rotatably supported by a housing pedestal 18 which is rigidly mounted upon a platform 13. The platform 13 is, in turn, rigidly mounted upon the upper end of an antenna tower which comprises the illustrated top crossbars 14a and 14b and angularly extending brace bars 14c.

More specifically, the shaft 17 is rigidly mounted upon the upper end of a tubular shaft 19 by means of a connecting ring 19a which is provided with an opening therethrough for bringing out circuit conductors to connect with the radiating element 16a of the antenna 16. The tubular shaft 19 is suitably journaled in a bearing member, not shown, provided in the base portion of the pedestal 18 and is also journaled in a bearing member 18a which is suitably mounted in an opening provided in the upper wall of the pedestal housing 18. A worm gear 20 rigidly mounted for rotation with the tubular shaft 19 and housed within the pedestal housing 18 is provided for rotating the tubular shaft 19 and the antenna 16 carried thereby. The tubular shaft 19 also carries for rotation therethrough a pair of friction plates 22 which are mounted upon a sleeve 22b rigidly connected to the shaft 19, and have a friction disc 21 interposed between the adjacent surfaces thereof so that the disc is rotated therewith when freed for rotary movement.

For the purpose of imparting rotary movement to the tubular shaft 19 and the parts carried thereby, a three-phase alternating current induction motor 23 is provided which is connected by means of the conductors 12k, 12L and 12m with the control station 11. This motor rigidly mounted upon the platform 13, is provided with a rotor shaft 23a, and is arranged to drive the worm gear 20 through a speed changing mechanism, the component parts of which are collectively indicated at 24. More specifically, the worm gear 20 is engaged by a driving worm 9 which is mounted upon a drive shaft 8 suitably journaled within bearing members provided in the side walls of the housing 18. This shaft also carries for rotation thereabout a high speed driving gear 31 and a low speed driving gear 30 which respectively mesh with gears 28 and 29 mounted for rotation with the rotor shaft 23a of the motor 23. More specifically, the high speed gear 31 is rigidly mounted upon a sleeve 31a which carries a clutch cone 32 at its inner end. Similarly, the low speed gear 30 is rigidly mounted upon one end of a sleeve 30a which carries a second clutch cone 33 at its inner end. Both of the two clutch assemblies, i. e., that comprising the elements 31, 31a and 32, and that comprising the elements 30, 30a and 33, are loosely mounted upon the shaft 8 for rotation thereabout. In order to clutch the shaft 8 to either of the clutch cones 32 or 33, a clutching element 34 comprising two oppositely facing clutch cones 34a and 34b is provided. These two cones are formed as an integral unit and are provided with a finger raceway therebetween which is adapted to receive a finger 38 carried by a clutch actuating lever 36. The clutching element 34 is slidably mounted upon a spline gear 35 secured to the shaft 8, and is provided with teeth meshing with the teeth of the spline gear so that when either of the clutch cones thereof is moved into engagement with one of the cones 32 or 33 a driving connection is established between the two shafts 23a and 8. The clutch actuating lever 36 is pivotally mounted upon the upper end of a post 37 carried by the platform 13, and is provided with a tail portion 36a formed of magnetic material. For the purpose of normally biasing the clutch cone 34a to engage the cone 33 so that the change speed mechanism 24 is provided with a low speed setting, a biasing spring 40 is provided. This spring is connected between a pin 36b carried by the tail portion 36a of the actuating lever 36 and a pin 41a which is mounted upon the upper end of a bracket piece 41 rigidly supported upon the platform 13. In order to pivot the lever 36 so that the cone 34a is disengaged from the cone 33 and the opposite cone 34b is brought into engagement with the cone 32, thereby to provide a high speed setting for the change speed mechanism 24, an electromagnet 39 is provided. This electromagnet is suitably supported upon a bracket piece 39a carried by the platform 13, is provided with a pole face disposed adjacent the tail piece 36a of the actuating lever 36, and is connected by means of the circuit conductors 12m and 12n with the control station 11.

For the purpose of arresting rotation of the tubular shaft 19 after the antenna 16 has been moved to a desired setting, a braking mechanism is provided which comprises the two coacting brake parts 43 and 46, and the brake actuating magnet 50. More specifically, the brake drum 46 is set screw mounted upon the end of the rotor shaft 23a, and is arranged to coact with the braking surface of the arcuate shaped brake band 43, which is axis mounted at 44 upon a supporting bracket 45 carried by the platform 13. Normally, i. e., with all movable parts of the antenna mount 10 at rest, the brake band 43 is biased to engage the drum 46, thereby to restrain the antenna 16 from being inadvertently moved due to wind or other pressures exerted thereon. To this end, a biasing spring 46 is provided, which is anchored at one end to a pin 43a carried by the upper end of the brake band 43, and is anchored at its other end to a pin 47a which is mounted upon the platform portion of a bracket piece 47 carried by the platform 13. For the purpose of actuating the brake band 43 out of engagement with the surface of the drum 46, at least the upper end of the band is formed of magnetic material and the braking magnet 50 is provided with a pole face disposed adjacent this upper end of the band. The magnet 50 is supported upon the upper end of a bracket piece 51 carried by the platform 13, and includes a winding which is connected for energization at the control station 11 over the cable conductors 12k and 12L.

For the purpose of revertively controlling the equipment provided at the control station 11, in order to provide an indication of the extent of movement and the position of the antenna 16, a commutating mechanism generally indicated at 26 is provided. In brief, this mechanism comprises a plurality of commutator segments 54c to 54h, inclusive; a wiper 55 adapted to engage the segments 54c to 54h, inclusive, in succession; a slip ring 57; a wiper or brush 58 engaging the slip ring 57; and an insulating sleeve 56 which rigidly supports the wiper 55 and the ring 57, and is set screw mounted upon the left end of the shaft 8. More specifically, the six commutator segments 54c to 54h, inclusive, are mounted upon a block of insulating material 52 which is supported by means of bracket pieces 53 upon the platform 13. These segments are disposed in predetermined radial positions about the shaft 8, which positions respectively correspond to different angular settings of the tubular shaft 19 and antenna 16. In this regard it is noted that the wiper 55 carried by the insulating sleeve 56, is, through the resilient arm portion thereof, biased positively to engage the different segments 54c to 54h, inclusive, in succession, and that the wiper end thereof is of sufficient width to bridge two of the segments during movement thereof out of engagement with one segment and into engagement with the next succeeding segment.

Referring now more particularly to the control station 11, the equipment there provided comprises a setting device 65, a wobble or gyrator motor 67 controlled over the leads 12c to 12h, inclusive, by the commutating mechanism 26, a control device 66 arranged to be jointly controlled by the setting device 65 and the wobble motor 67, and a relay network 68 which includes the three relays 110, 120 and 130. These relays are arranged to be controlled by the control device 66 to govern the operation of the motor 23, the clutch operating magnet 39, and the braking magnet 50 in the manner described below.

More specifically considered, the setting device 65 comprises a control panel 71 having a setting element or shaft 75 suitably journaled therein. A pointer and actuating knob assembly comprising the pointer 73 and the knob 74, is mounted upon the end of this shaft which projects through the panel 71. These two elements are rigidly secured to the end of the shaft 75, and the pointer 73 is arranged to coact with a scale 72 which is suitably mounted upon the front wall surface of the panel 71 and is graduated in degrees. More specifically, the angle inscriptions carried by the scale 72, when indexed by the pointer 73, provide an indication of the direction in which the antenna 16 is set to radiate a signal. For example, the 360° inscription upon the scale 72 may indicate a true north bearing of the antenna 16, such that the 90°, 180°, and 270° inscriptions respectively indicate west, south and east bearings of the antenna.

The wobble or gyrator motor 67 is preferably of the improved structure disclosed and claimed in Patent No. 2,275,827, granted March 10, 1942, H. W. Plensler, now Reissue 22,549. Briefly considered, this motor comprises a base or pedestal 100 which supports the field structure and the rotor assembly of the motor. The field structure comprises an annular magnetic member 99 provided with a closed rear wall 99a which supports six electromagnets 102c to 102h, inclusive, and also has a rotor shaft 85 suitably journaled therein at the exact center thereof. More specifically, the six electromagnets 102 are equiangularly spaced and are disposed at equal radial distances from the center of the rotor shaft 85. The windings of these magnets are commonly connected to the conductor 12a which extends to the terminal 70b of a direct current source 70, and are respectively connected by means of the circuit conductors 12c to 12h, inclusive, to the six commutating segments 54c to 54h, inclusive, of the commutating device 26. The outer pole faces of the six electromagnets 102 are disposed adjacent the inner wall of a magnetic armature or rotor plate 103, which is mounted upon the end of a wobble shaft 104 by means of a mounting assembly comprising the insert piece 106a and the collar 106. The wobble shaft 104 is connected by means of a universal joint 105 to the left end of the rotor shaft 85 within the enclosure of the magnetic field member 99. For the purpose of imparting rotary movement to the shaft 85 in response to the tilting of successive portions of the rotor plate 103 toward the field member 99 under the control of the electromagnets 102, the adjacent circumferential edges of the field member 99 and the rotor plate 103 are respectively provided with meshing teeth 101a and 101b. In this regard it is noted that a greater number of teeth are provided upon the adjacent edge of one of the two elements 99 and 103 than upon the edge of the other element, so that a given number of wobbles of the plate 103 will produce a given angular movement of the shaft 85. For example, if the shaft 85 is to be rotated in a clockwise direction, as viewed from the left end thereof in Fig. 2 of the drawings, when the wobble movement of the plate 103 proceeds in a clockwise direction, the number of teeth 101a provided upon the field member 99 should be less than the number of teeth 101b provided upon the rotor plate 103. With the teeth arranged in this manner, the shaft 85 will be rotated in a clockwise direction when the magnets 102 are energized in the reverse order. The extent of rotary movement of the shaft 85 is of course determined by the difference between the number of teeth on the element 99 and the number of teeth on the element 101b. Thus, if eighty-one teeth 101b are provided on the rotor element 103 and eighty teeth 101a are provided on the field member 99, the shaft 85 will be rotated through an angle of 4½° during each wobble cycle. This of course means that eighty wobble cycles are required in order to rotate the shaft 85 through one complete revolution. It will be understood, therefore, that by suitably proportioning the number of teeth 101a to the number of teeth 101b, the direction of rotation of the shaft 85 may be made to correspond to the direction of rotation of the shaft 19, and the amounts of movement of the two mentioned shafts for a given number of revolutions of the shaft 8 may be equalized. For example, if an 80:1 drive ratio is used between the worm shaft 8 and the tubular shaft 19, and the shaft 19 as viewed from the upper end thereof is driven in a clockwise direction in response to clockwise rotation of the shaft 8 as viewed from the left end thereof, the field member 99 should be provided with eighty teeth 101a and the rotor plate 103 should be provided with eighty-one teeth 101b. If this tooth ratio between the two elements 99 and 103 is used, the rotor shaft 85 will be rotated one revolution in a clockwise direction for each revolution of the tubular shaft 19 in a corresponding direction. This angular coincidence is maintained between the positions of the two shafts 19 and 85, whereby the position of the shaft 85 provides a true indication of the position of the antenna 16.

For the purpose of maintaining a sector of the toothed periphery 101b of the rotor plate 103 in engagement with the sector of the toothed portion 101a of the field member 99, a biasing element in the form of a coil spring 107 is provided. This spring is anchored at one end to the outer end of the collar 106 and at its opposite end to the inner wall of the motor housing 107a. As thus arranged, the spring 107 serves to maintain a sector of the rotor plate 103 in engagement with a sector of the field member 99 regardless of the angular position of the rotor plate and the shaft 85.

As indicated above, the control device 66 is arranged for joint control by the setting device 65 and the wobble motor 67. In brief, this control device comprises two commutating discs 82 and 87, three slip rings 91, 92 and 93 suitably mounted for rotation with the shaft 85, and a wiper carrying arm 77 and associated slip ring 78 mounted for rotation with the setting element or shaft 75. More specifically, the arm 77 and the slip ring 78 are rigidly mounted upon an insulating sleeve 76 which is set screw mounted upon the left end of the setting shaft 75. A wiper 79 suitably mounted to engage the slip ring 78 is provided for electrically connecting the arm to one side of the direct current source 70. The disc 82 is mounted upon an insulating sleeve 84 which is set screw mounted upon the right end of the rotor shaft 85, carries an insulating segment 83 of predetermined width at a predetermined point around its periphery, and is adapted to be engaged by a wiper 80 which is mounted upon the cross member of the arm 77. The commutating disc 87 is provided with two semi-circular sectors 87a and 87b which are mounted upon an insulating disc 86 having segments 88 and 89 which separate the adjacent flat edges of the two sectors. The discs 86, together with the three slip rings 91, 92 and 93, are rigidly mounted upon an insulating sleeve 90 which is set screw mounted upon the rotor shaft 85. A resilient wiper 81 anchored at one end to the cross piece of the arm 77 is provided for engaging the peripheral surfaces of the two ring segments 87a and 87b and the two insulating segments 88 and 89 which separate the two ring segments. Wipers 94, 95 and 96 suitably mounted to engage the slip rings 91, 92 and 93, respectively, are provided for controlling the energization of the three relays 110, 120 and 130 in accordance with the operation of the setting shaft 75 and the operation of the rotor shaft 85.

For the purpose of appropriately energizing the operating magnet of the relays 110, 120 and 130, and the windings of the electromagnets 102 in the manner fully explained below, the direct current source 70 of appropriate voltage is provided. Current for energizing the motor 23, the clutch operating magnet 39 and the braking magnet 50 is supplied from a suitable three-phase alternating current source 69.

*Resynchronizing apparatus*

As pointed out with greater particularity hereinafter, should the source of direct current 70 fail during an interval when the antenna 16 is being moved from one setting to a new setting, the desired synchronous relationship between the position of the tubular shaft 19 and the position of the rotor shaft 85 may be lost. In accordance with the present invention, a resynchronizing device 27 is provided for automatically reestablishing this desired synchronous relationship after it has been lost. In brief, this device comprises a latching element 59 which is pivotally mounted at 60 upon the arms of a U-shaped bracket 61; a latching magnet 62; a stationary contact 63; and a movable contact 59b which is mounted upon and insulated from the tail of the latching element 59. The latching element 59 is provided with a finger 59a which is adapted to engage a recess or slot 22a provided in the periphery of the disc 21 at a predetermined point around the circumference of the disc. The magnet 62 and the bracket piece 60 are suitably mounted upon a stepped projection 18b which extends from the housing 18. Under normal conditions, i. e., when the desired operating voltage appears across the terminals 70a and 70b of the direct current source 70, the magnet 62 is energized in a circuit which includes the two cable conductors 12a and 12j. With this magnet energized, the latching element 59 is pivoted so that the finger 59a thereof is disposed within the slot 22a to restrain the disc 21 against rotation. In order to pivot the latching element 59 so that the finger 59a thereof is disengaged from the slot 22a when the magnet 62 is deenergized, a biasing spring 62a is provided, which is anchored at one end to the projection 18b and at its other end to the underside of the latching element 59. An adjusting screw 64 suitably threaded through the left end of the projection 18b is provided for limiting the extent of movement of the latching element 59 under the influence of the biasing spring 62a. Normally, i. e., with the magnet 62 energized, the two contacts 63 and 59b are engaged. These contacts are arranged to be disengaged under the influence of the spring 62a when the magnet 62 is deenergized.

Before considering the operation of the system, it is pointed out that with all movable parts of the system at rest, the movable parts 73, 75, 77, 85 and 19 occupy predetermined relative positions. More specifically, the azimuth bearing of the antenna 16 precisely corresponds to the azimuth bearing indicated by the setting of the pointer 73 relative to the scale 72. Under these conditions, the wiper 80 engages the exact center of the insulating segment 83, the wiper 81 engages the exact center of the insulating segment 88, and one or two of the electromagnets 102c to 102h, inclusive, of the wobble motor 67 are energized, depending upon the position of the commutating wiper 55. Also, the magnet 39 is deenergized, such that the clutch cone 34a is biased to engage the clutch cone 33, and the braking magnet 50 is deenergized, such that the braking parts 46 and 43 are engaged. Moreover, the magnet 62 of the resynchronizing device 27 is energized to retain the finger 59a of the latching element 59 in engagement with the recess 22a of the disc 21, whereby this disc is restrained against rotary movement.

In considering the operation of the system, it may be assumed that all movable parts of the system occupy the positions illustrated in the drawings and further that it is desired to move the antenna 16 to a setting which corresponds to a setting of the pointer 73 opposite the 315° marking of the scale 72. To this end, the knob 74 is twisted to rotate the setting shaft 75 in a counterclockwise direction until the pointer 73 is indexed with the 315° scale marking. Incident to the rotation of the shaft 75, the arm 77 and the wipers 81 and 80 carried thereby are rotated about the discs 87 and 82 respectively. As the wiper 81 is moved out of engagement with the insulating segment 88 and into engagement with the disc sector 87b, a circuit is completed for energizing the winding of the relay 110, this circuit extending from the terminal 70b of the source 70 by way of the winding of the relay 110, the wiper 96 and its engaged slip ring 93, the sector 87b, the wiper 81, the arm 77, the slip ring 78 and the wiper 79 to the opposite terminal 70a of the source 70. When thus energized, the relay 110 attracts its armatures 111 and 112, thereby to open the contacts 115 and 116, and to close the contacts 113 and 114. At the contacts 113 and 114, the relay 110 completes two branches of the three-phase circuit for energizing the three-phase alternating current motor 23. One branch of this circuit may be traced as extending from the terminal 69b of the source 69 by way of the contacts 126, the armatures 122 and 112, the contacts 114, and the conductor 12k to the left terminal of the motor 23. The second completed branch of the circuit for energizing the motor 23 extends from the terminal 69a by way of the contacts 125, the armatures 121 and 111, the contacts 113, and the conductor 12L to the middle terminal of the motor 23. The third terminal of the three-phase motor 23 is permanently connected to the terminal 69c of the source 69 by the cable conductor 12m. In operating, the relay 110 also completes a circuit for energizing the braking magnet 50, this circuit extending from the terminal 69a of the source 69 by way of the contacts 125, the armatures 121 and 111, the contacts 113, the conductor 12L, the winding of the magnet 50, the cable conductor 12k, the contacts 114, the armatures 112 and 122, and the contacts 126 to the source terminal 69b.

When thus energized, the magnet 50 attracts the associated magnetic armature of the brake band 43 so that this band is disengaged from the brake drum 46 to release the movable parts of the change speed mechanism 24 for operation. The motor 23, when energized in the three-phase circuit described above, drives the tubular shaft 19 and the antenna 16 carried thereby in a clockwise direction through a driving connection which includes the shaft 23a, the gear 29, the gear 30, the clutch disc 33, the clutch cone 34a, the spline gear 35, the shaft 8, the worm 9 and the worm gear 20. Thus, it will be noted that during the initial movement of the antenna 16, the change speed mechanism 24 occupies its low speed setting.

Shortly after the wiper 81 engages the disc sector 87b to effect the operation of the relay 110 and the magnet 50 and to initiate the operation of the motor 23 in the manner explained above, the wiper 80 is disengaged from the insulating segment 83 and moved into engagement with the conductive disc 82, thereby to complete a circuit for energizing the winding of the relay 130. This circuit extends from the terminal 70b of the source 70 by way of the winding of the relay 130, the wiper 94 and its engaged slip ring 91, the disc 82, the wiper 80, the arm 77, the slip ring 78 and the wiper 79 to the opposite terminal 70a of the source 70. When thus energized, the relay 130 attracts its armature 131 to close its contacts 132 so that a circuit including the conductors 12m and 12n is completed for energizing the operating magnet 39 of the change speed mechanism 24. When this magnet is energized, it attracts the magnetic tail piece 36a of the clutch lever 36 against the bias afforded by the spring 40, thereby to move the clutch cone 34a out of engagement with the clutch cone 33. Thus, the low speed driving connection established through the meshing gears 29 and 30 between the rotor shaft 23a and the shaft 8 is interrupted. As the tail piece 36a of the lever 36 is pivoted toward the pole face of the magnet 39, the clutch cone 34b is slid along the spline gear 35 until it engages the clutch disc 32. Incident to the engagement of the two clutching elements 32 and 34b, a high speed driving connection is established between the rotor shaft 23a and the tubular shaft 19. This connection includes the meshing gears 28 and 31 having a 1:1 drive ratio therebetween, the engaged clutch elements 32 and 34b, the spline gear 35, the shaft 8, the worm 9 and the worm gear 20. Thus, the speed at which the tubular shaft 19 and the antenna carried thereby are moved from the old setting to the newly selected setting is materially increased through the action of the magnet 39 to change the setting of the change speed mechanism 24.

As the motor 23 operates to drive the shaft 19 in the manner just explained, it also acts, through the electromechanical coupling comprising the commutating device 26 and the wobble motor 67, to rotate the shaft 85 by a corresponding amount. More specifically, as the shaft 8 is rotated in a clockwise direction, the wiper 55 carried at the left end thereof is brought successively into engagement with the commutating segments 54h, 54g, etc. to successively complete the operating circuit for the windings of the electromagnets 102h, 102g, etc. In this regard it will be noted that the operating circuits for the six magnets 102 of the wobble motor 67 commonly include the conductors 12a and 12j, and respectively include the conductors 12c, 12d, 12e, 12f, 12g and 12h. These circuits also commonly include the slip ring 57, the wiper 58 and the normally engaged contacts 63 and 59b of the resynchronizing device 27, and respectively include the commutating segments 54c, 54d, etc.

As the electromagnets 102h, 102g, etc. are successively energized under the control of the commutating device 26 in the order indicated, different sectors of the rotor plate 103 are successively tilted to engage the toothed periphery of the field member 99. In this regard it is pointed out above that the wiper 55 of the commutating device 26 is of sufficient width to bridge the gap between adjacent commutating segments 54. Accordingly, the commutation of the electromagnets 102 proceeds in a manner such that each magnet is overlappingly energized with the preceding and next succeeding magnets. Thus, the tilting of successively different portions of the rotor plate 103 into engagement with different toothed sectors of the field member 99 proceeds in a smooth and uninterrupted manner. Due to the difference in the number of teeth respectively provided on the field member 99 and the rotor plate 103, the shaft 85 is moved through an angle exactly equal to the angle of rotation of the tubular shaft 19, during each wobble cycle of the plate 103.

As the clockwise rotation of the shaft 85 proceeds, the insulating segments 83 and 88 are rotated in a direction to reengage the ends of the wipers 80 and 81, respectively. Shortly before the shaft 85 is rotated to a position corresponding to the new setting of the shaft 75, the insulating segment 83 carried by the disc 82 rides beneath the end of the wiper 80 to interrupt the above traced circuit for energizing the relay 130. When thus deenergized, the relay 130 retracts its armature 131 to open the contact 132, so that the above traced circuit for energizing the clutch operating magnet 39 is broken. Incident to the deenergization of the magnet 39, the spring 40 acts upon the pivoted clutch lever 36 to disengage the two clutch elements 32 and 34b, thereby to interrupt the high speed driving connection between the rotor shaft 23a and the shaft 8, and to reengage the clutch elements 33 and 34a, whereby the low speed driving connection between the two enumerated shafts is reestablished. Thus, the slow speed movement of the three shafts 8, 19, and 85 is resumed. During continued movement of the two shafts 19 and 85, and more particularly, when the shaft 85 is rotated so that the segment 88 engages the end of the wiper 81, the previously traced circuit for energizing the relay 110 is interrupted. In releasing, the relay 110 retracts its armatures 111 and 112, so that the contacts 113 and 114 are opened, and the contacts 115 and 116 are closed. At the contacts 113 and 114, the two above described branches of the three-phase circuit for energizing the motor 23 are broken, whereby operation of this motor is arrested. Also incident to the opening of the contacts 113, the previously traced circuit for energizing the braking magnet 50 is interrupted. When the magnet 50 is thus deenergized, the brake band 43 is drawn into engagement with the brake drum 46 under the influence of the biasing spring 46'. Due to the frictional engagement between the engaged braking parts 43 and 46, and the slow speed at which the shaft 19 is operating, rotation of this shaft and the shaft 8 is arrested almost immediately after the magnet 50 is deenergized. When rotation of the shaft 8 is thus stopped, the operation of the commutating device 26 successively to energize the magnets 102 of the wobble motor 67 is arrested. Thus, rotation of the shaft 85 is arrested with the wiper 81 engaging the insulating segment 88. In this regard, it is noted that the movement of the shaft 85 which follows the deenergization of the braking magnet 50, and is caused by the inertia of the moving parts of the system, is just sufficient to rotate the shaft 85 so that the exact center of the insulating segment 88 is positioned beneath the bearing point of the wiper 81. Thus, the width of the insulating segment 88 is primarily determined by the extent of the residual movement of the shaft 8 which follows the disengagement of the wiper 81 from either of the two commutating sectors 87a and 87b.

From the foregoing explanation, it will be understood that rotation of the setting shaft 75 from its illustrated position through an angle of 45° to a new setting wherein the wiper 73 indexes the 315° marking of the scale 72, results in an exact 45° angular displacement of the shaft 19 in a clockwise direction, as viewed from the top, such that the antenna 16 is moved from a true north bearing to a true northeast bearing.

Assuming now that the setting shaft 75 is, through operation of the knob 74, rotated from its illustrated position in a direction and by an amount such that the pointer 73 indexes the 90° marking of the scale 72, the arm 77 is rotated 90° in a counterclockwise direction, as viewed from the left end thereof, so that the wiper 81 is actuated to engage the disc segment 87a. When these two circuit elements are brought into engagement, a circuit is completed for energizing the relay 120, this circuit extending from the source terminal 70b by way of the winding of the relay 120, the wiper 95 and its engaged slip ring 92, the disc sector 87a, the wiper 81, the arm 77, the slip ring 78 and the wiper 79 to the opposite terminal 70a of the source 70. When thus energized, the relay 120 attracts its armatures 121 and 122 to open the contacts 125 and 126, and to close the contacts 123 and 124. When the two sets of contacts last enumerated are closed, the two left terminals of the motor 23 are reversely connected to the terminals 69a and 69b of the three-phase current source 69. More specifically, the terminal 69b, is in this case, connected to the middle terminal of the motor 23 over a path which includes the contacts 116, the armatures 112 and 122, the contacts 124 and the conductor 12L. The left terminal of the motor 23, on the other hand, is connected to the terminal 69a of the current source 69 over a path which includes the contacts 115, the armatures 111 and 121, the contacts 123 and the conductor 12k. When the motor 23 is thus reversely connected to the terminals of the current source 69, the shaft 8 is driven in a counterclockwise direction as viewed from the left end thereof and the shaft 19 is rotated in a counterclockwise direction as viewed from the upper end thereof. Here again, the initial movement of the three shafts 8, 19 and 85 proceeds at a slow speed due to the slow speed setting of the change speed mechanism 24. When, however, the setting shaft 75 and the arm 77 carried thereby are rotated sufficiently to bring the wiper 80 into engagement with the disc 82, the previously traced circuit is completed for energizing the relay 130. This relay, upon operating, completes the previously traced circuit for energizing the clutch magnet 39, whereby the change speed mechanism 24 is shifted from its low speed setting to its high speed setting in the manner explained above. Thus, the speed of rotation of the three shafts 19, 8 and 85 is increased. In this regard, it is noted that during the initial movement of the arm 77 to a new setting and more particularly when the relay 120 operates, a circuit for energizing the braking magnet 50 is completed through the contacts 123, 124, 115 and 116, whereby the braking parts 46 and 43 of the brake mechanism are disengaged.

In the present case, wherein the shaft 8 is rotated in a counterclockwise direction as viewed from the left end thereof, the magnets 102c, 102d, etc. of the wobble motor 67 are energized under the control of the commutating device 26 in the order named, thereby to effect counterclockwise rotation of the shaft 35 and the circuit elements carried thereby. After a predetermined time interval, the insulating segment 83 carried by the disc 82 is operated to engage the end of the wiper 80 so that the operating circuit for the relay 130 is broken. When thus deenergized, the relay 130 opens its contacts 132 to deenergize the clutch magnet 39, whereby the change speed mechanism 24 is shifted from its high speed setting to its low speed setting in the manner previously described. Thus, low speed movement of the three shafts 19, 8 and 85 is resumed. During continued movement of the shaft 85 and when the settable shaft 19 is operated to a position substantially corresponding to the new setting of the shaft 75, the wiper 81 is disengaged from the disc sector 87a. Incident to the disengagement of these two circuit elements, the previously traced circuit for energizing the relay 120 is interrupted. In releasing, the relay 120 opens its contacts 124 and 123 to deenergize the motor 23 and the braking magnet 50 in the manner previously explained. When the magnet 50 is thus deenergized, the brake band 43 is operated to engage the brake drum 46, thereby to arrest the movement of the antenna 16, the shaft 19, the shaft 8, the wobble motor 67 and the shaft 85. Thus, a new position is established for the shaft 19 and the antenna 16 carried thereby, which exactly corresponds to the new setting imparted to the setting shaft 75.

From the above explanation, it will be understood that when the setting shaft 75 is rotated in either direction away from an established setting to a new setting, the settable shaft 19 is moved in a corresponding direction, and also that the extent of movement of the settable shaft 19 is determined solely by the extent of movement of the setting shaft 75. In other words, the movement of the settable shaft 19 is arrested through the action of the commutating device 26, the wobble motor 67 and the control device 66, after it has been moved to a position which precisely corresponds to the new setting of the setting shaft 75. In this regard, it will also be understood that the setting shaft 75 should, in each instance, be moved through the smaller angle from an established setting to a new setting. Otherwise stated, the extent of movement of the pointer 73 should not exceed an angle of 180 degrees. On this point, it will be noted that if the setting shaft 75 is rapidly rotated through an angle in excess of 180 degrees, the wiper 81 will first engage one of the two conductive sectors 87a and 87b to initiate movement of the three shafts 19, 8 and 85 in one direction; the change speed mechanism 24 will next be operated from its low speed setting to its high speed setting; following which the wiper 81 will pass out of engagement with the particular sector 87a or 87b engaged thereby and over the insulating segment 89 into engagement with the other sector. In response to the last mentioned operation, the particular relay 110 or 120 which is operated will be deenergized and the other relay will be energized. These two relays in reversing the settings thereof, function reversely to connect the two left terminals of the motor 23 to the terminals 69a and 69b of the current source 69, thereby to reverse the direction of rotation of the rotor shaft 23a and the parts actuated thereby. It is also pointed out that the width of the insulating segment 89 is negligible, such that the wiper 81 cannot be stopped in a position where it is disengaged from both of the sectors 87a and 87b, and engages the insulating segment 89. The purpose of utilizing an insulating segment 89 of exceedingly small width is to prevent the shaft 75 and the parts carried thereby from being rotated to a position displaced 180 degrees from the position of the shaft 19, without producing a corresponding movement of the shaft 19 and the associated movable parts.

It will be noted from a consideration of the above described circuits for energizing the three-phase alternating current motor 23 from the source 69, that provisions are made for preventing any two of the terminals of this source from being short-circuited through the contacts of the two relays 110 and 120. Thus, it is pointed ed out above that in order for the middle and left terminals of the motor 23 to be connected respectively to the terminals 69b and 69a of the source 69, it is necessary that the relay 110 occupy its restored position and that the relay 120 occupy its operated position. In such case, the indicated connections between the two left terminals of the motor 23 and the source terminals 69a and 69b are established through the back contacts 115 and 116 of the relay 110 and through the front contacts 123 and 124 of the relay 120. On the other hand, if the middle and left terminals of the motor 23 are to be connected to the terminals 69a and 69b of the source 69, respectively, the relay 110 is operated and the relay 120 is restored, so that the desired connections are set up through the front contacts 113 and 114 of the relay 110 and the back contacts 125 and 126 of the relay 120. Thus, in order for connections to be made between the two left terminals of the motor 23 and the terminals 69a and 69b of the source 69, it is necessary that one of the two relays 110 and 120 be operated and that the other of the two relays be restored. It will also be apparent that with both of these relays released, the source terminals 69a and 69b are open-circuited. The same condition prevails when the two relays 110 and 120 are concurrently operated. Accordingly, if both of the two indicated relays are inadvertently operated, due to concurrent engagement of the wiper 80 with the two sectors 87a and 87b or to defective insulation of one of the parts included in the control circuits for the relays, the source terminals 69a and 69b cannot be short-circuited.

It is also pointed out above that since the insulating segment 83 is of greater width or extent than the aligned insulating segment 88, such that the wiper 81 is, during rotation of the shaft 75, operated to engage one of the sectors 87a and 87b before the wiper 80 is operated to engage the disc 82, the change speed mechanism 24 cannot be operated to its high speed setting concurrently with energization of the driving motor 23. Thus, the resistance afforded by the static inertia of the moving parts of the system and the frictional engagement of these parts with their bearing surfaces, is initially overcome by the force multiplication supplied through the two driving gears 29 and 34 while the change speed mechanism 24 occupies its low speed setting. By virtue of this interlock arrangement, it is possible to utilize a motor 23 of smaller physical size and less weight to effect the operation of an antenna 16 and associated movable elements of given weight and mass.

*Operation of the resynchronizing apparatus*

From the preceding explanation, it will also be understood that if for any reason the direct current source 70 should fail during an interval when the tubular shaft 19 and the antenna 16 carried thereby are being operated from one position to a new position, any energized ones of the electromagnets 102 are immediately deenergized along with the relay 130, if operated, and the operated one of the two relays 110 and 120. Under such circumstances, operation of the wobble motor 67 may stop before movement of the tubular shaft 19 is arrested in response to the resulting release of the operated one of the two relays 110 and 120. Accordingly, the established predetermined angular relationship between the settings of the two shafts 19 and 85 is lost or destroyed. This will certainly happen if the current source 70 fails during an interval when the change speed mechanism occupies its high speed setting, such that the movable parts of the mount 10 are operating at high speed at the time of the current source failure.

In order to reestablish the synchronous relationship between the movements of the two shafts 19 and 85 after the relative positions thereof have been changed in the manner just explained, the resynchronizing device 27 is provided. To consider the operation of this device, it will be noted that the normally energized latching magnet 62 is deenergized concurrently with failure of the direct current source 70. When this magnet is deenergized, the latching element 59 is pivoted in a counterclockwise direction under the influence of the coil spring 62a, whereby the latching finger 59a thereof is withdrawn from the recess 22a provided in the periphery of the disc 21. When the latching finger 59a is disengaged from the recess 22a, the disc 21 is free to move with the tubular shaft 19 so that the peripheral edge thereof rides beneath the latching finger 59a. Incident to the pivotal movement of the latch 59 to its retracted position, the contacts 59b and 63 are disengaged to open a point in the common portion of the previously traced circuits for energizing the magnets 102 of the wobble motor 67. Since, moreover, the peripheral edge of the disc 21 is positioned beneath the latching finger 59a, the latch 59 cannot be rotated by the magnet 62 to move the contact 59b into engagement with the contact 63 when the direct current source 70 is subsequently restored. Accordingly, when the source 70 is subsequently restored, to cause the energization and operation of one of the two relays 110 and 120, and the operation of the motor 23 to drive the tubular shaft 19, this shaft and the disc 21 carried thereby are rotated through an angle of slightly less than 360 degrees before operation of the wobble motor 67 to drive the shaft 85 is resumed. More specifically, when the shaft 19 is rotated back to a position such that the position thereof bears the desired angular relationship with respect to the position of the shaft 85, the recess 22a registers with the latching finger 59a, permitting the latch 59 to be pivoted in a clockwise direction under the influence of the attractive force exerted by the energized magnet 62. As the latch 59 is rotated in a clockwise direction, the finger 59a enters the recess 22a to lock the disc 21 against further rotation, and the contact 59b carried by the tail of the latch 59 is moved back into engagement with the contact 63. In response to the last mentioned operation, the circuits for successively energizing the windings of the electromagnets 102 are reestablished, whereby operation of the wobble motor 67 to drive the shaft 85 is resumed. From the above explanation it will be noted that operation of the motor 67 to drive the shaft 85 is only resumed, following a failure and subsequent restoration of the direct current source 70, after the shaft 19 has been rotated to reestablish the desired angular relationship between this shaft and the shaft 85.

From the foregoing explanation it will be understood that the described control system is extremely positive and reliable in operation, requires a relatively small number of easily constructed parts, and is very rugged. Moreover, by virtue of the high speed-low speed methods of operating the moving parts of the system, a relatively heavy structure may be moved from any desired setting to a new setting in a minimum amount of time. On this point, it has been found that the system is capable of operating to move an antenna array weighing two hundred pounds or more through an angle of 180 degrees within a time interval of less than four seconds. Moreover, the discrepancy between the angular settings of the two shafts 19 and 75 is limited not to exceed three-eighths of one degree. This accuracy in the following movements of the shafts 19 and 85 is of course partially due to the accuracy of response of the wobble motor 67 to a given increment of movement of the shaft 8. Thus, the rotor 103 of the wobble motor 67 is effectively provided with twelve stopping points, due to the fact that any one or any two of the six electromagnets 102 may remain energized when movement of the shaft 8 is arrested. It will be understood in this regard that the accuracy with which the shaft 85 follows the movement of the shaft 8 can, if desired or necessary, be increased by increasing the number of electromagnets 102 provided in the wobble motor 67, and correspondingly increasing the number of commutating segments 54 of the commutating device 26. It will also be understood from the above explanation, that the braking magnet 50 is only energized during those periods when the shaft 19 is being rotated from an established setting to a new setting. Since these periods are of relatively short duration and only occur at infrequent intervals, a small magnet 50 may be used, which is considerably over-excited during those periods when it is energized. Similarly, the clutch operating magnet 39 is only energized during a portion of each period when the shaft 19 is being moved from an established setting to a new setting. In this regard it is pointed out that the 1:1 tooth ratio between the high speed driving gears 28 and 31, the tooth ratio between the low speed gears 29 and 30, and the width of the insulating segment 83 are so proportioned relative to each other that the period of high speed operation of the shafts 8, 19 and 85 is considerably less than the period of low speed operation of the three shafts, during movement of the two shafts 19 and 85 through any angle not exceeding 180 degrees. Accordingly, the magnet 39 is only energized during the shorter of the two periods. Moreover, if the change in the position of the setting shaft 75 is sufficiently small, the magnet 39 is not energized at all. More generally considered, the period of energization of the magnet decreases with decreasing increments of movement of the shaft 75. For the above reasons, the magnet 39 may also be small and may be considerably over-excited during the short infrequent intervals when it is energized.

Although the above described system is particularly useful in remotely controlling a directive antenna so that the antenna may be moved to any desired setting, it may also be used to move any object which must be operated directly but controlled from a remote point. For example, the system may be used to remotely control the settings of valves, ship rudders, or the like. The system possesses great novelty and utility when used to control the reeling and unreeling of a wire antenna of the character conventionally used on aircraft. In the last mentioned application, the system may be utilized to accurately expose a given length of the wire antenna so that the antenna will possess a predetermined wave length. The control of the reeling and unreeling operation may be affected by mounting the manually operable setting knob 74 upon the instrument panel of a plane.

While one embodiment of the invention has been described, it will be understood that various modifications may be made therein, which are within the true spirit and scope of the invention.

I claim:

1. In a control system which includes a setting element and a settable element, an asynchronous connection between said setting element and said settable element including driving means for said settable element and means responsive to movement of said setting element from one position to a new position for initiating operation of said driving means, electro-mechanical means including an element synchronously operated with said settable element through a plurality of revolutions during movement of said settable element over its normal range, and operative to arrest the operation of said driving means when said settable element is operated to a position corresponding to the new position of said setting element, and means for automatically establishing a predetermined positional relationship between said settable element and said synchronously operated element before operating said last-named element synchronously with said settable element.

2. In a control system, a settable element, a setting element, an asynchronous connection between said setting element and said settable element including a control element, driving means for said settable element and means jointly controlled by said setting and control elements for initiating the operation of said driving means in response to movement of said setting element from one position to a new position and for arresting the operation of said driving means when said settable element is operated to a position corresponding to the new position of said setting element, electromechanical means controlled by said driving means to operate said control element in synchronism with said settable element through a plurality of revolutions during movement of said settable element over its normal range, and means controlled by said settable element for preventing said control element from being operated in synchronism with said settable element until said settable element is operated to a predetermined position relative to the position of said control element.

3. In a control system, a settable element, a setting element, an asynchronous connection between said setting element and said settable element including a control element, driving means for said settable element and means jointly controlled by said setting and control elements for initiating the operation of said driving means in response to movement of said setting element from one position to a new position and for arresting the operation of said driving means when said settable element is operated to a position corresponding to the new position of said setting element, electromechanical means controlled by said driving means to operate said control element in synchronism with said settable element and with a predetermined positional relationship therebetween and through a plurality of revolutions during movement of said settable element over its normal range, said electromechanical means comprising a current source which upon failure thereof renders said electromechanical means inactive, whereby the positional relationship between said settable element and said control element is changed during continued movement of said settable element after said source has failed, and means for automatically reestablishing said predetermined positional relationship between said control and settable elements before operating said elements in synchronism following a period of failure of said source.

4. In a control system, a settable element, a setting element, an asynchronous connection between said setting element and said settable element including a control element, driving means for said settable element and means jointly controlled by said setting and control elements for initiating the operation of said driving means in response to movement of said setting element from one position to a new position and for arresting the operation of said driving means when said settable element is operated to a position corresponding to the new position of said setting element, electromechanical means controlled by said driving means to operate said control element in synchronism with said settable element and with a predetermined positional relationship therebetween and through a plurality of revolutions during movement of said settable element over its normal range, said electromechanical means comprising a current source which upon failure thereof renders said electromechanical means inactive, whereby the positional relationship between said settable element and said control element is changed during continued movement of said settable element after said source has failed, and means responsive to failure of said current source for preventing said control element from being operated in synchronism with said settable element until said predetermined positional relationship between said elements is reestablished.

5. In a control system, a pair of movable elements, electromechanical means for operating one of said elements in synchronism with the other element through a plurality of revolutions during movement of said other element over its normal range and with a predetermined positional relationship between said elements, said electromechanical means comprising a current source which upon failure thereof renders said electromechanical means inactive, whereby the positional relationship between said elements is changed during continued movement of said other element after said source has failed, and means for automatically reestablishing said predetermined positional relationship between said elements before operating said elements in synchronism following a period of failure of said source.

6. In a control system, a pair of movable elements, electromechanical means for operating one of said elements in synchronism with the other element through a plurality of revolutions during movement of said other element over its normal range and with a predetermined positional relationship between said elements, said electromechanical means comprising a current source which upon failure thereof renders said electromechanical means inactive, whereby the positional relationship between said elements is changed during continued movement of said other element after said source has failed, and means controlled by said other element for automatically rendering said electromechanical means inoperative to operate said one element incident to failure of said source, and for preventing said electromechanical means from operating said one element until said predetermined positional relationship between said elements is reestablished following a period of failure of said source.

7. In a control system, a pair of movable elements, electromechanical means for operating one of said elements in synchronism with the other element through a plurality of revolutions during movement of said other element over its normal range and with a predetermined positional relationship between said elements, said electromechanical means comprising a current source which upon failure thereof renders said electromechanical means inactive, whereby the positional relationship between said elements is changed during continued movement of said other element after said source has failed, and means responsive to failure of said current source for preventing said electromechanical means from operating said other element until said predetermined positional relationship of said elements is reestablished.

8. In a control system, a pair of movable elements, electromechanical means for operating one of said elements in synchronism with the other element through a plurality of revolutions during movement of said other element over its normal range, said electromechanical means comprising a current source which upon failure thereof renders said electromechanical means inactive, whereby said one element is no longer operated in synchronism with said other element, and means controlled by said other element for controlling said electromechanical means to automatically reestablish the synchronous operation of said one element with said other element after each period of failure of said source.

9. In a control system, a rotatable element, means for driving said element, commutating means actuated by said driving means, motor means provided with a rotor and field magnets, circuits commonly including a source of current and controlled by said commutating means to successively energize said magnets in the proper order and at the proper rate to operate said rotor in synchronism with said element, whereby the synchronous operation of said rotor with said element is arrested in the event said source fails, and means controlled by said driving means for automatically controlling said circuits to reestablish the synchronous operation of said rotor with said element after a period of failure of said source.

10. In a control system, a rotatable element, means for driving said element, commutating means actuated by said driving means, motor means provided with field windings and a rotor which is operated in response to successive energization of said field windings, a control element driven by said rotor, circuits commonly including a source of current and controlled by said commutating means to successively energize said magnets in the proper order and at the proper rate to maintain a fixed predetermined relationship between the angular positions of said elements, and means controlled by said driving means for preventing said circuits from being energized by said source when the relationship between the angular positions of said elements is altered.

11. In a control system, a rotatable element, means for driving said element, commutating means actuated by said driving means, motor means provided with field windings and a rotor which is operated in response to successive energization of said field windings, a control element driven by said rotor, circuits commonly including a source of current and controlled by said commutating means to successively energize said magnets in the proper order and at the proper rate to maintain a fixed predetermined relationship between the angular positions of said elements, whereby the relationship between the angular positions of said elements is altered in response to failure of said source, means responsive to failure of said source for opening said circuits, and means controlled by said driving means for locking said last-named means against reclosure of said circuits so long as the predetermined relationship between the angular positions of said elements is altered.

12. In a control system, a rotatable element, means for driving said element, commutating means actuated by said driving means, motor means provided with field windings and a rotor which is operated in response to successive energization of said windings, a control element driven by said rotor, circuits commonly including a source of current and controlled by said commutating means to successively energize said magnets in the proper order and at the proper rate to maintain a fixed predetermined relationship between the angular positions of said elements, a disk mounted for rotation with said rotatable element, contacts for opening and closing said circuits, an element for opening and closing said contacts and for locking said disk against rotation with said rotatable element, means biasing said locking element to free said disk for rotation and to open said contacts, means including a magnet normally energized from said source for holding said locking element in an operated position such that said contacts are closed and said disk is locked against rotation, whereby said contacts are opened to interrupt said circuits and said disk is freed for rotation with said rotatable element in response to deenergization of said magnet, and means including coacting parts of said locking element and said disk for preventing said magnet from moving said locking element to its operated position when the relationship between the angular positions of said elements is altered.

13. In a control system, a rotatable element, means for driving said element, a disk mounted for rotation with said element, an element for locking said disk against rotation with said rotatable element, means biasing said locking element to free said disk for rotation, means including a normally energized magnet for holding said locking element in an operated position such that said disk is locked against rotation with said rotatable element, a rotatable control element, means responsive to operation of said locking element into its operated position for operating said control element in synchronism with said rotatable element and with a fixed relationship between the angular positions of said rotatable element and said control element, and means comprising coacting parts of said locking element and said disk for preventing said last-named means from operating said control element when the relationship between the angular positions of said rotatable element and said control element is altered.

14. A control system comprising, a setting element, a settable element, an asynchronous connection between said setting element and said settable element including driving means for said settable element and means responsive to adjustment of said setting element from a position at which the system is in equilibrium for initiating operation of said driving means, electromechanical position-repeating means connected between said settable element and said responsive means for arresting operation of said driving means when said settable element is operated to a position corresponding to the adjusted position of said setting element, said position repeating means including an element rotatable through a plurality of revolutions during movement of said settable element over its normal range, and means for establishing a predetermined positional relation between said rotatable element and one of said setting and settable elements before establishing an operative connection therebetween.

WILLIAM L. DUNN.

REFERENCES CITED

The following references are of record in the file of this patent:

UNITED STATES PATENTS

| Number | Name | Date |
|---|---|---|
| 714,786 | Day | Dec. 2, 1902 |
| 1,238,503 | Fiske et al. | Aug. 28, 1917 |
| 1,509,248 | Meitner | Sept. 23, 1924 |
| 1,692,051 | Patterson | Nov. 20, 1928 |
| 1,944,326 | Hudson | Jan. 23, 1934 |
| 2,275,827 | Plensler | Mar. 10, 1942 |